J. CLARK.
Altiscope.
No. 53,115.
Patented March 13, 1866.
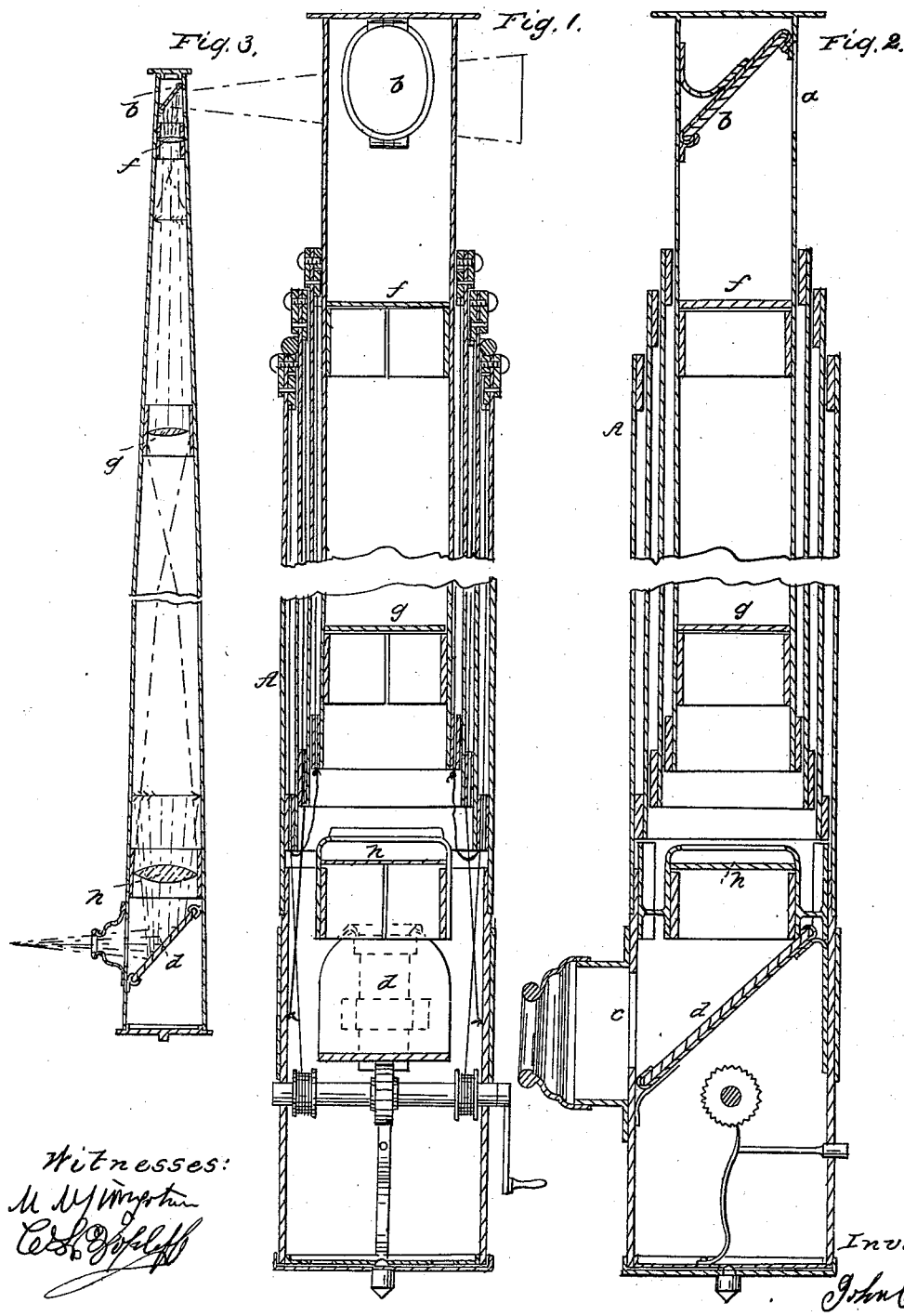
Witnesses:
Inventor:
John Clark

UNITED STATES PATENT OFFICE.

JOHN CLARK, OF PHILADELPHIA, PENNSYLVANIA.

IMPROVEMENT IN ALTISCOPES.

Specification forming part of Letters Patent No. 53,115, dated March 13, 1866.

*To all whom it may concern:*

Be it known that I, JOHN CLARK, of Philadelphia, in the county of Philadelphia and State of Pennsylvania, have invented a new and Improved Altiscope; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention, taken in the plane indicated by the line $x\ x$, Fig. 2. Fig. 2 is a similar section of the same, the plane of section being indicated by the line $y\ y$, Fig. 1. Fig. 3 is a diagram, showing the manner in which the image is formed.

Similar letters of reference indicate like parts.

The object of this invention is an instrument to be used as an observatory or lookout for viewing distant or near objects, as if seen from an elevated point of view, to enable a person standing on the ground—as in the street, for instance—to look over the tops of the houses and see over the city and surrounding country in the same manner as if he was up on a high tower and looking through a telescope.

The invention consists in an instrument composed mainly of a hollow column, either stationary or revolving, with an opening in one side close to the top and with an opening in the opposite side near the bottom, the said openings being fitted with oblique mirrors or reflectors, either plane or concave, in such a manner that by the upper mirror the surrounding objects are reflected on the lower one and by said lower mirror the pictures are reflected through the lower opening, where they may be seen by an observer.

The invention consists, also, in the use of a telescope tube or column, in combination with two or more inclined reflectors, and with or without suitable lenses, in such a manner that the upper reflector can be raised higher or lower, as may be desirable, and that the same can be adjusted according to the object or objects to be reflected. The image of said objects is formed in that end of the tube farthest from the eye of the observer, and it is transmitted to the opposite end of said tube by a lens, the position of which can be adjusted to suit the length of the tube.

My instrument consists of a large tube or hollow column, A, say thirty to fifty or a hundred feet high and ten to twelve inches in diameter at the bottom and about six or seven inches at the top. This tube may be made of wood, metal, or any other suitable material, and I do not wish to limit myself to any particular size or shape. It may be round, polygonal, or of any other suitable form or shape, and constructed of any proper material and to any requisite size.

Near the top of the tube an opening, $a$, is made in one side, and a mirror or reflector, $b$, is placed in the tube opposite said opening at an angle of about forty-five degrees. Near the bottom and at the opposite side of the tube is a similar opening, $c$, and a reflector, $d$, is arranged opposite to said opening, also at an angle of about forty-five degrees. The reflectors $b\ d$ may be plane mirrors, or, if desired, concave mirrors may be used. When this tube is placed in an erect position any object within range of the top mirror will be reflected down through the tube to the lower mirror and may be seen by looking through the lower opening, $c$. If the tube is very long and of a comparatively small diameter, with nothing but plane reflectors, the view or field of vision would be very limited; but in order to enlarge the view and magnify the objects seen I use a certain arrangement of lenses different from anything I have seen in other optical instruments. I place in the top of the tube an object-glass, $f$, of short focus, which forms an image in the tube of all objects reflected by the mirror. A short distance below this object-glass I place a second lens, $g$, of a long focus, which receives the image already formed and transmits it enlarged down through the tube. Near the bottom of the tube the enlarged image is intercepted by the lens $h$, which again enlarges it and throws it on the mirror $d$, that reflects it to the eye of the observer. (See Fig. 3.) By this arrangement a beautiful telescopic view can be obtained of the whole city and surrounding country for miles, if the tube is so constructed that it can be rotated on its own center.

If, for a plane mirror on the top, a concave mirror is substituted, the object-glass can be dispensed with, as the image will be formed by said mirror and transmitted to the bottom of the tube by the lens $g$. If, in place of the lower plane mirror, a concave mirror is substituted, the eyeglass or lens $h$ can be dispensed with, and the instrument can be made of one lens and two curved mirrors.

Where the altiscope is intended to be used as a permanent lookout, or to be attached to a building or other structure, for looking over farms, &c, a single tube of the required length may be used. For a portable instrument it must be made in sections or joints that slide into each other in the manner of telescope-tubes.

The top mirror, $b$, is fastened with a hinge or center, so that it can be adjusted to any angle.

The second lens, $g$, next to the object-glass, is adjustable, and by this arrangement I am enabled to accommodate my lenses to any length of tube, because by moving the lens $g$ up or down the image formed by the object-glass can be thrown to any distance required and will be enlarged to any size, depending on the distance thrown or the focus of the lens, or both.

A suitable mechanism may be applied to raise or lower the lens $g$ from the ground, if the tube is made in sections.

The tube may be furnished with a center, which rests on a platform, or it may be arranged on a suitable turn-table, so that it can be rotated freely in either direction.

When the tubes are arranged to extend in the manner of a telescope the several sections are connected by cords $i$, which extend over pulleys $j$, secured in the upper ends of the several sections, as shown in Fig. 1 of the drawings, and a windlass, $k$, near the bottom end of the lowest section serves to raise and lower the tube.

It is obvious that the number of sections can be increased to any desired extent, and a tube can thus be obtained of any required length.

The cords extend from both ends of the windlass over the pulleys in the top of the first or lowest section, and thence down to the lowest end of the second section. Two other cords extend from the bottom end of the first section over the rollers in the top of the second section and down to the bottom end of the third section, and two more cords extend from the bottom end of the second section over the pulleys in the top end of the third section and down to the bottom end of the fourth section, and so on if more than four sections are used. By this arrangement of the cords the several sections rise and fall simultaneously.

I do not wish to confine myself, however, to any particular mechanism for elevating the tubes; neither do I confine myself to any particular number of sections or to any peculiar arrangement of lenses.

If, in place of the lens or eyeglass at the bottom of the tube, a plate of ground glass is substituted, a large and beautiful picture of all objects within range of the top mirror will be formed on the plate, and may be viewed by looking into the lower mirror either with the naked eye or through a large eyeglass. It thus becomes a very interesting camera-obscura, forming pictures of the landscape for miles around, and may be enlarged or magnified to any extent, depending upon the arrangement of the lenses and the length of tube.

I claim as new and desire to secure by Letters Patent—

Combining with a telescopic column of tubes an arrangement of mirrors and lenses, such as is herein described, with provisions for adjusting these parts to any elevation of the tubes desired, in the manner and for the purposes herein set forth.

JOHN CLARK.

Witnesses:
W. HAUFF,
WM. DEAN OVERELL.